United States Patent [19]

Mutoh et al.

[11] Patent Number: 5,025,319

[45] Date of Patent: Jun. 18, 1991

[54] SOLID STATE IMAGE PICKUP DEVICE DRIVING METHOD UTILIZING AN ELECTRONIC SHUTTER OPERATION

[75] Inventors: Hideki Mutoh, Kanagawa; Kazuya Oda, Tokyo; Kazuhiro Kawajiri, Kanagawa, all of Japan

[73] Assignee: Fuji Photo Film Co., Ltd., Kanagawa, Japan

[21] Appl. No.: 371,783

[22] Filed: Jun. 27, 1989

[30] Foreign Application Priority Data

Jul. 12, 1988 [JP] Japan .................. 63-171879
Sep. 27, 1988 [JP] Japan .................. 63-239596

[51] Int. Cl.$^5$ ............................................. H04N 3/14
[52] U.S. Cl. ............................ 358/213.29; 358/213.22
[58] Field of Search ................. 358/213.22, 213.26, 358/213.29, 909, 48

[56] References Cited

U.S. PATENT DOCUMENTS 4,551,758 11/1985 Masunaga et al. .............. 358/213.22
4,597,013 6/1986 Matsumoto ....................... 358/213.23
4,897,728 1/1990 Yamada ............................ 358/213.29

FOREIGN PATENT DOCUMENTS 60125079 7/1985 Japan .

Primary Examiner—Stephen Brinich
Attorney, Agent, or Firm—Sughrue, Mion, Zinn, Macpeak & Seas

[57] ABSTRACT

A solid image pickup device driving method is provided in which a charge storage type solid image pickup device of a frame transfer interline system is used to detect still picture signals. Either the odd-numbered or even-numbered field elements are transferred to charge transfer paths in a light receiving section and next transferred to a storage section. The remaining field elements are then transferred to charge transfer paths in the light receiving section. The field elemeents residing in the storage section are then transferred to a horizontal CCD for output. Finally, the remaining field elements, having been stored in the charge transfer paths in the light receiving section, are transferred to the storage section, and then transferred to the horizontal CCD for output. The driving method provides for increased vertical resolution and facilitates miniaturization of the device. In addition, the shutter periods and/or the signal amplification factors of the odd-numbered and even-numbered fields are adjusted so that, with respect to the picture elements of the odd-numbered and even-numbered fields, with light applied under the same conditions, the output signals of the odd-numbered and even-numbered fields obtained through scanning are equal to each other. Therefore, the odd-numbered field scanning operation and the even-numbered field scanning operation each possess an equal ratio of the video signal to smear, and field flickering is therefore suppressed.

10 Claims, 5 Drawing Sheets

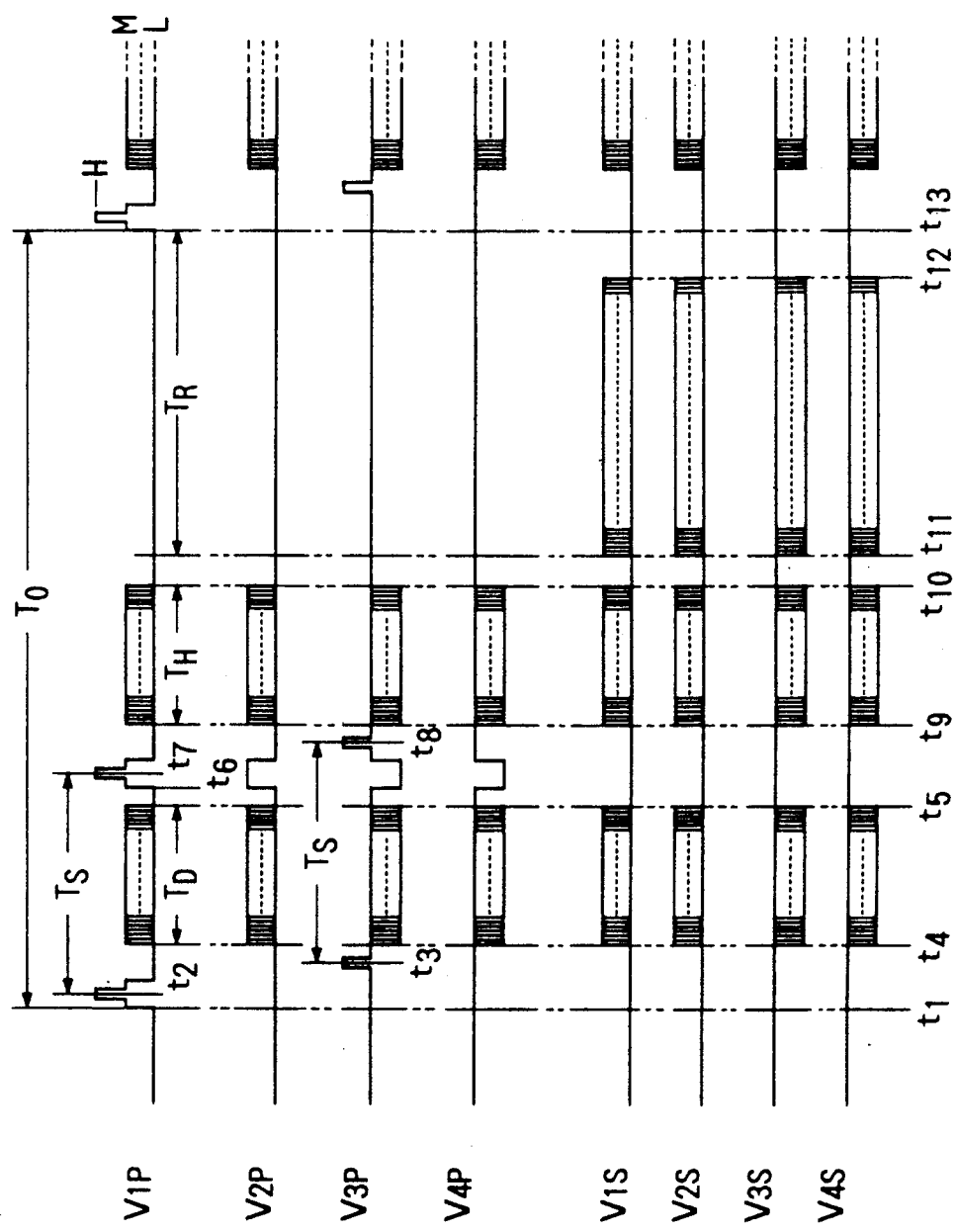

SOLID STATE IMAGE PICKUP DEVICE DRIVING METHOD UTILIZING AN ELECTRONIC SHUTTER OPERATION

BACKGROUND OF THE INVENTION

The present invention relates to a driving method for reading out signal charges in a charge storage type solid image pickup device which is applied to electronic still cameras, and more particularly to a driving method for reading out signal charges by utilization of an electronic shutter operation.

One example of a charge storage type solid image pickup device applied to an electronic still camera is a charge storage type image pickup device of a frame interline transfer system as shown in FIG. 1.

The solid image pickup device is designed as follows. As shown in FIG. 1, a plurality of light receiving elements (or picture elements) $PA_{11}$, $PA_{12}$ through $PA_{1n}$; $PB_{21}$, $PB_{22}$ through $PB_{2n}$; $PA_{31}$, $PA_{31}$ through $PA_{3n}$; $PB_{41}$, $PB_{42}$ through $PB_{4n}$; and so forth, are formed in columns on a semiconductor substrate and are arranged in matrix form. The rows of light receiving elements $PA_{11}$ through $PA_{1n}$; $PA_{31}$ through $PA_{3n}$; and so forth, in the odd-numbered lines provide odd-numbered fields, and the rows of light receiving elements $PB_{21}$ through $PB_{2n}$, $PB_{41}$ through $PB_{4n}$; and so on, provide even-numbered fields. In FIG. 1, reference characters $1_1$, $1_2$, through $1_n$ designate individual columns of charge transfer paths joining a respective column of the above-described light receiving elements. The upper surfaces of these charge transfer paths $1_1$ through $1_n$ are covered with shielding films so as to be shielded from light.

Transfer gates $G_{11}$ through $G_{1n}$; $G_{21}$ through $G_{2n}$; $G_{31}$ through $G_{3n}$; $G_{41}$ through $G_{4n}$; and so forth are arranged in rows and connect a respective light receiving element in a corresponding row and a charge transfer path adjacent thereto. These transfer gates transfer signal charges produced in the light receiving elements to the charge transfer paths. First transmit gates comprising charge transfer elements $HA_{11}$ through $HA_{1n}$; $HB_{21}$ through $HB_{2n}$; $HA_{31}$ through $HA_{3n}$; $HB_{41}$ through $HB_{4n}$; and so forth, correspond to respective ones of the above-described transfer gates and are formed in the charge transfer paths $1_1$, $1_2$ through $1_n$. Second transmit gates comprising charge transfer elements $LA_{11}$ through $LA_{1n}$; $LB_{21}$ through $LB_{2n}$; $LA_{31}$ through $LA_{3n}$; $LB_{41}$ through $LB_{4n}$; and so forth, are similarly formed in the above-described charge transfer paths.

The region occupied by the light receiving elements and the charge transfer paths is a light receiving section. Provided below the light receiving section is a storage section made up only of charge transfer paths. In the charge transfer paths of the storage section, transmit gates also are provided to form the same number of charge transfer elements as in the light receiving section. The upper surface of the storage section is covered so as to be shielded from light. Drive signals $V_{1P}$, $V_{2P}$, $V_{3P}$, and $V_{4P}$ of a so-called "four-phase drive system" are applied to the transmit gates in the light receiving section, and drive signals $V_{1S}$, $V_{2S}$, $V_{3S}$ and $V_{4S}$ of a four phase drive system are applied to the transmit gates in the storage section.

A horizontal CCD is connected to the charge transfer elements at the end of the storage section, so that signal charges transferred from the storage section are applied in series to an output amplifier in response to drive signals $\phi_1$ and $\phi_2$ of a so-called "two-phase drive system".

The shutter operation and the reading operation of the charge storage type solid image pickup device of the prior art will be described with reference to FIG. 6.

First, a resetting operation for eliminating unwanted signal charges is carried out. At a time instant $t_1$, the drive signals $V_{1P}$, $V_{3P}$ and $V_{4P}$ are set to the "M" level (which is between the "H" and "L" levels) and the drive signal $V_{2P}$ is set to the "L" level. At the following time instant $t_2$, the drive signal $V_{1P}$ is raised to the "H" level for a predetermined period of time, so that the transfer gates $G_{11}$, $G_{12}$ through $G_{1n}$; $G_{31}$, $G_{32}$ through $G_{3n}$; $G_{51}$, $G_{52}$ through $G_{5n}$, and so forth, of the odd-numbered fields are turned on and the unwanted signal charges of the light receiving elements $PA_{11}$, $PA_{12}$ through $PA_{1n}$; $PA_{31}$, $PA_{32}$ through $PA_{3n}$; $PA_{51}$, $PA_{52}$ through $PA_{5n}$; and so forth, of the odd-numbered fields are transferred to the charge transfer elements. Next, at the time instant $t_3$, the drive signal $V_{3P}$ is raised to the "H" level for a predetermined period of time. This causes the transfer gates $G_{21}$, $G_{22}$ through $G_{2n}$; $G_{41}$, $G_{42}$ through $G_{4n}$; $G_{61}$, $G_{62}$ through $G_{6n}$; and so forth, to be turned on and the unwanted signal charges of the light receiving elements $PB_{21}$, $PB_{22}$ through $PB_{2n}$; $PB_{41}$, $PB_{42}$ through $PB_{4n}$; $PB_{61}$, $PB_{62}$ through $PB_{6n}$; and so forth, are transferred to the charge transfer elements. During a predetermined period of time $T_D$ between the time instants $t_4$ and $t_5$, charge transfer of a four-phase drive system is carried out with the drive signals $V_{1P}$, $V_{2P}$, $V_{3P}$ and $V_{4P}$, so that the unwanted signal charges are shifted from the light receiving section to the storage section. Thus, the resetting operation has been accomplished.

During the resetting operation, that is, the charge transfer period $T_D$ for sweeping out the above-described unwanted signals charges, all of the transfer gates are in the "off" state. In addition, all of the light receiving elements perform their photo-electric conversion operations. At the time instant $t_6$, the drive signals $V_{1P}$ and $V_{2P}$ are set to the "M" level, and the drive signals $V_{3P}$ and $V_{4P}$ to the "L" level. At the time instant $t_7$, the drive signal $V_{1P}$ is raised to the "H" level so that the signal charges produced by the light receiving elements $PA_{11}$, $PA_{12}$ through $PA_{1n}$; $PA_{31}$, $PA_{32}$ through $PA_{3n}$; $PA_{51}$, $PA_{52}$ through $PA_{5n}$; and so forth, of the odd-numbered fields are transferred to the charge transfer elements. Hence, the period of time $T_S$ between the time instant $t_2$ and $t_7$ is a shutter period for the light receiving elements arranged in the odd-numbered fields.

Next, at the time instant $t_8$, the drive signal $V_{3P}$ is raised to the "H" level, so that the signal charges produced by the light receiving elements $PB_{21}$, $PB_{22}$ through $PB_{2n}$; $PB_{41}$, $PB_{42}$ through $PB_{4n}$; $PB_{61}$, $PB_{62}$ through $PB_{6n}$; and so forth, of the even-numbered fields are transferred to the charge transfer elements. Hence, the period $T_S$ between the time instants $t_3$ and $t_8$ is a shutter period for the light receiving elements arranged in the even-numbered fields. The period between the time instants $t_2$ and $t_7$ and the period between the time instants $t_3$ and $t_8$ are made equal to each other so that the shutter period for the light receiving elements in the odd-numbered fields and the shutter period for the light receiving elements in the even-numbered fields are equal to each other.

Next, during the predetermined period $T_H$ between the time instants $t_9$ and $t_{10}$, all the signal charges in the charge transfer elements are transferred to the storage section at high speed, and during the period $T_R$ the time instants $t_{11}$ and $t_{12}$ they are transferred in parallel to the horizontal CCD line by line. Next, they are transferred in series by the horizontal CCD to the output amplifier so that they are output in series by the output amplifier.

The period $T_O$ between the time instants $t_1$ and $t_{13}$ is a period for which one still picture is taken with the electronic still camera.

As is apparent from the above description, the shutter period is determined by setting the time interval $T_S$ between the transfer gate opening and closing operations.

The above-described conventional solid image pickup device suffers from the following problems. When the signal charges produced by the picture elements are transferred to the respective charge transfer elements, the signal charges of two picture elements in the odd-numbered and even-numbered fields are mixed, and only the field picture signal charges are obtained as a result. Therefore, the vertical resolution is decreased by one-half. Furthermore, since the number of the charge transfer paths in the storage section must be equal at least to the number of the charge transfer paths in the light receiving section, the area occupied by the storage section is relatively large, with the result that the semiconductor chip is unavoidably large in size.

Moreover, the conventional device suffers from field flickering. Field flickering occurs when the ratio of mixing smear components with the signal charges corresponding to one field (odd-numbered or even-numbered) is larger than that for the other field. In addition, field flickering becomes significant as the shutter speed increases because the ratio of the smear component to the signal charge increases with shutter speed.

SUMMARY OF THE INVENTION

An object of the present invention is to increase the vertical resolution of the solid image pickup device by providing a driving method which eliminates the problem created by the mixing of signal charges of two picture elements in the odd-numbered and even-numbered fields.

Another object of the present invention is to reduce the size of the resulting semiconductor chip by not requiring the number of charge transfer paths in the storage section to be equal to the number of charge transfer paths in the light receiving section.

A further object of the present invention is to suppress the field flickering phenomenon.

In order to achieve the object, in the present invention, either the odd-numbered or even-numbered field elements are transferred to charge transfer paths in a light receiving section and next transferred to a storage section. The remaining field elements are then transferred to charge transfer paths in the light receiving section. The field elements residing in the storage section are then transferred to a horizontal CCD for output. Finally, the remaining field elements, having been stored in the charge transfer paths in the light receiving section, are transferred to the storage section, and then transferred to the horizontal CCD for output.

In addition, the shutter period of a first field scanning operation is made different from that of a second field scanning operation, whereby the ratio of the smear component to signal charge in the first field scanning operation is made equal to that of the smear component to signal charge in the second field scanning operation.

Alternatively, in the present invention, output signals of the odd-numbered fields and those of the even-numbered fields are amplified with different amplification factors. The amplification factors are so adjusted that, with respect to the odd-numbered and even-numbered fields, the signals read under the same conditions are equal. This causes the ratio of the smear component to signal charge in the first field scanning operation to be made equal to that of the smear component to signal charge in the second field scanning operation.

BRIEF DESCRIPTION OF THE DRAWINGS

FIG. 6 is a timing chart for a description of the prior art device.

DESCRIPTION OF THE PREFERRED EMBODIMENTS

Figure 1:
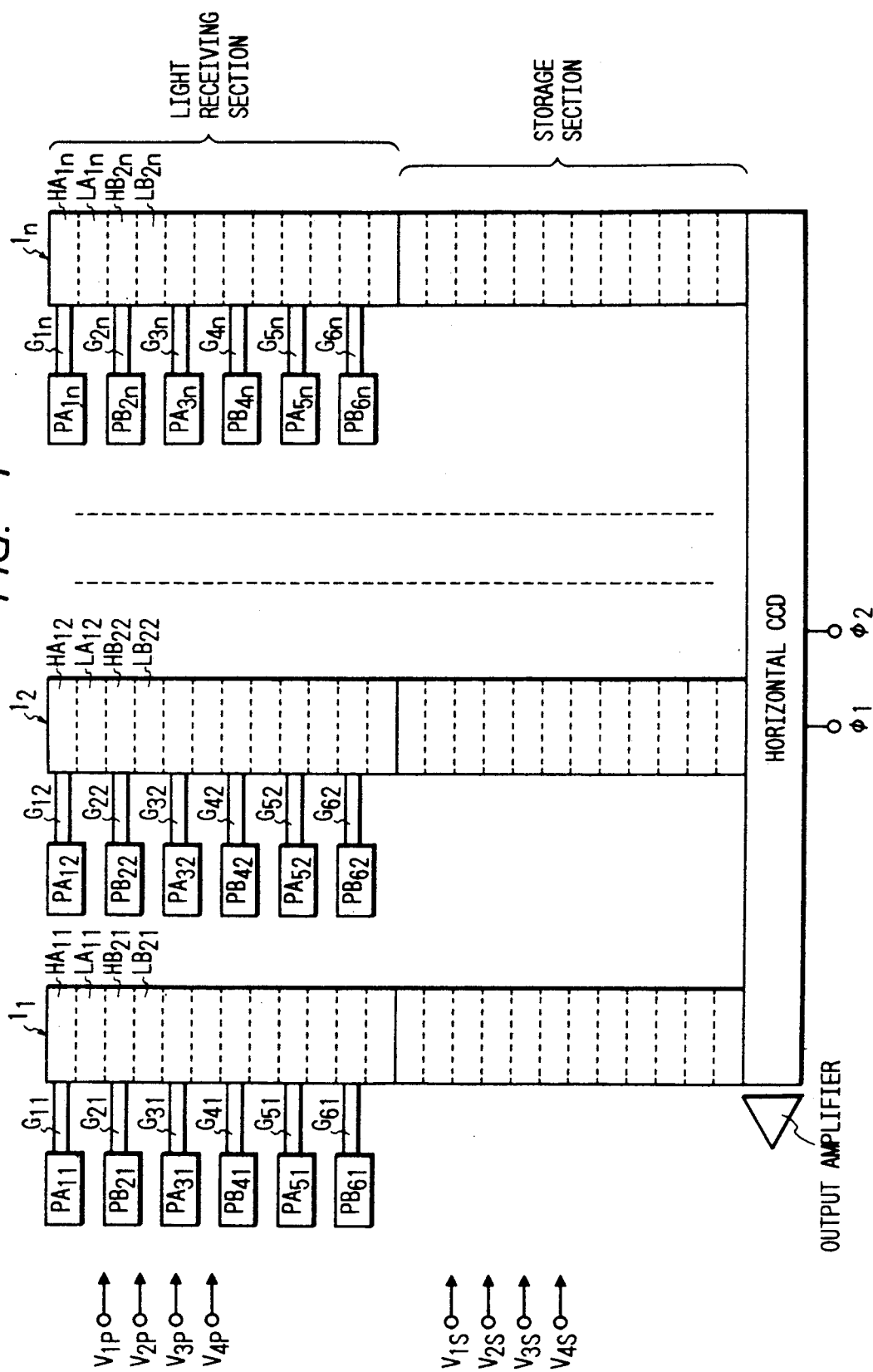
FIG. 1 is a block diagram outlining the arrangement of a solid image pickup device.

One embodiment of this invention will be described with reference to the accompanying drawings. For convenience of description, the method of the present invention is applied to a solid image pickup device equivalent to that which has been described with reference to FIG. 1.

Figure 2:
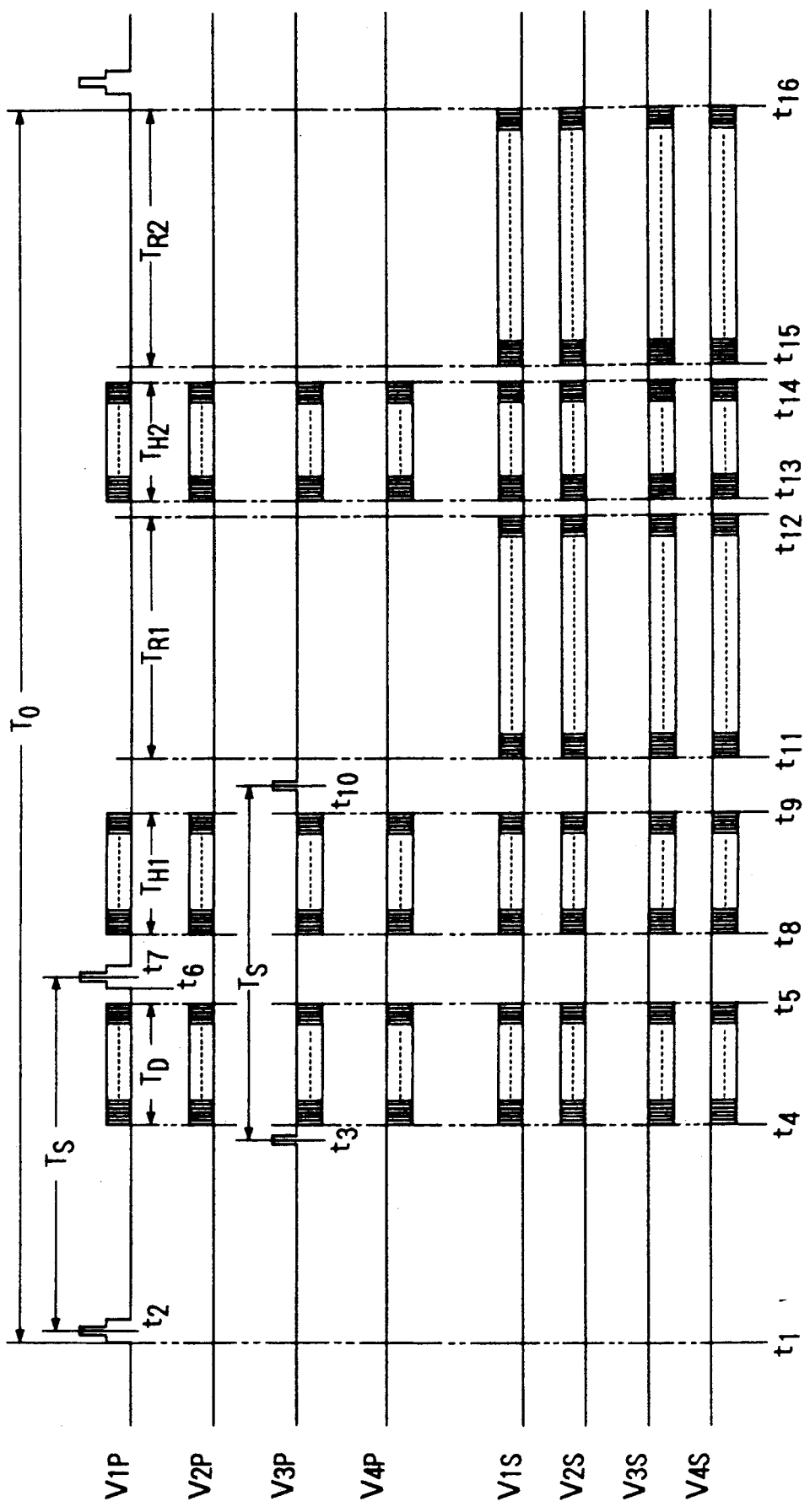
FIG. 2 is a timing chart for a description of a first embodiment of the invention.

The shutter operation and the reading operation of the charge storage type solid image pickup device thus organized will be described with reference to FIG. 2.

First, a resetting operation for eliminating unwanted signal charges is carried out. At a time instant $t_1$, the drive signals $V_{1P}$, $V_{3P}$ and $V_{4P}$ are set to the "M" level (which is between the "H" and "L" levels) and the drive signal $V_{2P}$ is set to the "L" level. At the following time instant $t_2$ the drive signal $V_{1P}$ is raised to "H" level for a predetermined period of time, so that the transfer gates $G_{11}$, $G_{12}$ through $G_{1n}$; $G_{31}$, $G_{32}$ through $G_{3n}$; $G_{51}$, $G_{52}$ through $G_{5n}$; and so forth, of the odd-numbered fields are turned on and the unwanted signal charges of the light receiving elements $PA_{11}$, $PA_{12}$ through $PA_{1n}$; $PA_{31}$, $PA_{32}$ through $PA_{3n}$; $PA_{51}$, $PA_{52}$ through $PA_{5n}$; and so forth, of the odd-numbered fields are transferred to the charge transfer elements. Next, at the time instant $t_3$, the drive signal $V_{3P}$ is raised to the "H" level for a predetermined period of time. This causes the transfer gates $G_{21}$, $G_{22}$ through $G_{2n}$; $G_{41}$, $G_{42}$ through $G_{4n}$; $G_{61}$, $G_{62}$ through $G_{6n}$; and so forth, to be turned on and the unwanted signal charges of the light receiving elements $PB_{21}$, $PB_{22}$ through $PB_{2n}$; $PB_{41}$, $PB_{42}$ through $PB_{4n}$; $PB_{61}$, $PB_{62}$ through $PB_{6n}$; and so forth, are transferred to the charge transfer elements. During a predetermined period of time $T_D$ between the time instants $t_4$ and $t_5$, charge transfer of a four-phase drive system is carried out with the drive signals $V_{1P}$, $V_{2P}$, $V_{3P}$ and $V_{4P}$, so that the unwanted signal charges are shifted from the light receiving section to the storage section. Thus, the resetting operation has been accomplished.

During the resetting operation, that is, the charge transfer period $T_D$ for sweeping out the above-described unwanted signals charges, all of the transfer gates are in the "off" state. In addition, all of the light receiving elements perform their photo-electric conversion operations. At the time instant $t_6$, the drive signals $V_{1P}$, $V_{3P}$ and $V_{4P}$ are set to the "M" level, and the drive signal $V_{2P}$ to the "L" level. At the time instant $t_7$ the drive signal $V_{1P}$ is raised to the "H" level so that the signal charges produced by the light receiving elements $PA_{11}$, $PA_{12}$ through $PA_{1n}$; $PA_{31}$, $PA_{32}$ through $PA_{3n}$; $PA_{51}$, $PA_{52}$ through $PA_{5n}$; and so forth, of the odd-numbered fields are transferred to the charge transfer elements. Hence, the period of time $T_S$ between the time instant $t_2$ and $t_7$ is a shutter period for the light receiving elements arranged in the odd-numbered fields.

During the period $T_{H1}$ between the time instants $t_8$ and $t_9$, all the signal charges in the charge transfer paths of the light receiving section are transferred to the storage section with the drive signals $V_{1P}$, $V_{2P}$, $V_{3P}$, $V_{4P}$, $V_{1S}$, $V_{2S}$, $V_{3S}$ and $V_{4S}$ of four-phase drive system. During the period $T_{H1}$, all the transfer gates are in the "off" state, and therefore only the signal charges of the odd-numbered fields are transferred to the storage section.

At a predetermined shutter period $T_S$ after the time instant $t_3$, that is, at the time instant $t_{10}$, the drive signals $V_{1P}$ and $V_{2P}$ are set to the "L " level, the drive signal $V_{3P}$ to the "H" level and the drive signal $V_{4P}$ to the "M" level. This causes the transfer gates $G_{21}$, $G_{22}$ through $G_{2n}$; $G_{41}$, $G_{42}$ through $G_{4n}$; $G_{61}$, $G_{62}$ through $G_{6n}$; and so forth, in the even-numbered fields to be placed in the "on" state, and the signal charges of the light receiving elements $PB_{21}$, $PB_{22}$ through $PB_{2n}$; $PB_{41}$, $PB_{42}$ through $PB_{4n}$; $PB_{61}$, $PB_{62}$ through $PB_{6n}$; and so forth, of the even-numbered fields are transferred to the charge transfer elements. As was described above, at the time instant $t_{10}$ which occurs after the predetermined shutter period $T_S$ after the time instant $t_3$, the drive signals $V_{1P}$ and $V_{2P}$ are set to the "L" level, the drive signal $V_{3P}$ to the "H" level, and the drive signal $V_{4P}$ to the "M" level. Thus, the shutter period for the even-numbered field can be made equal to that of the odd-numbered field. This will prevent the degradation of the picture quality which otherwise may be caused when a frame picture is reproduced.

During the predetermined period $T_{R1}$ between the time instants $t_{11}$ and $t_{12}$, with the drive signals $V_{1P}$, $V_{2P}$, $V_{3P}$ and $V_{4P}$ maintained unchanged in level, a charge transfer operation of four-phase drive system is carried out with the drive signals $V_{1S}$, $V_{2S}$, $V_{3S}$ and $V_{4S}$. That is, a signal charges for one line in the storage section are transferred to the horizontal CCD and are then transferred in series to the output amplifier with the drive signals $\phi_1$ and $\phi_2$ of the horizontal CCD. In this way they are output in series by the output amplifier. The above-described signal charge output operation is carried out for all the signal charges of the storage section, so that the signal charges of the odd-numbered fields are output in series. During that period, the drive signals $V_{1P}$, $V_{2P}$, $V_{3P}$ and $V_{4P}$ are maintained unchanged in level, whereby the signal charges in the charge transfer paths of the light receiving section are stored in photodiode arrays. Therefore, the method of the invention can suppress the reduction in smear when compared with the conventional method.

During the period $T_{H2}$ between the times instants $t_{13}$ and $t_{14}$, all the signal charges in the charge transfer paths of the light receiving section are transferred to the storage section with the drive signals $V_{1P}$ through $V_{4P}$ and $V_{1S}$ through $V_{4S}$. During that period $T_{H2}$, all the transfer gates are in the "off" state, and therefore only the signal charges of the even-numbered fields are transferred to the storage section.

Next, during the period $T_{R2}$ between the time instants $t_{15}$ and $t_{16}$, a charge transfer operation of four-phase drive system is carried out only with the drive signals $V_{1S}$, $V_{2S}$, $V_{3S}$ and $V_{4S}$. That is, the signal charges for one line in the storage section are transferred to the horizontal CCD, and are then transferred in series to the output amplifier with the drive signals $\phi_1$ and $\phi_2$ of the horizontal CCD. In this way, they are output in series by the output amplifier. This signal charge outputting operation is carried out for all the signal charges in the storage section, so that the signal charges of the even-numbered fields are output in series.

During the total period $T_O$ between the time instants $t_1$ and $t_{16}$, the signal charges for one frame that is, the signal charges produced by all the picture elements can be read out. Therefore, the method of the invention can double the resolution when compared with the conventional method.

A second embodiment of the above-described invention offers the improvement that field flickering is suppressed. In the first embodiment, in order to read the signal charges corresponding to both an odd-numbered field picture and an even-numbered field picture, first the signal charges corresponding to the odd-numbered field picture are temporarily held in the storage section. During the period that the signal charges are held in this manner, the signal charges corresponding to the even-numbered field picture are transferred to the following vertical charge transfer paths. Then the signal charges corresponding to the odd-numbered field picture in the storage section are read out, and the signal charges corresponding to the even-numbered field picture are read out. Thus, the signal charges corresponding to the odd-numbered field picture are transferred from the picture elements to the light shielded storage section at high speed. On the other hand, the signal charges corresponding to the even-numbered field picture are held in the vertical charge transfer paths until the signal charges corresponding to the odd-numbered field picture are read out. Therefore, during this period, mixing of smear components occurs. Since the amount of mixing of smear components with the signal charges corresponding to the even-numbered field picture is larger than that of mixing smear components with the signal charges corresponding to the odd-numbered field picture, a field flickering phenomenon occurs. The field flickering phenomenon occurs more significantly when the shutter speed increases, because the ratio of smear component to signal charge increases with the shutter speed.

Figure 4:
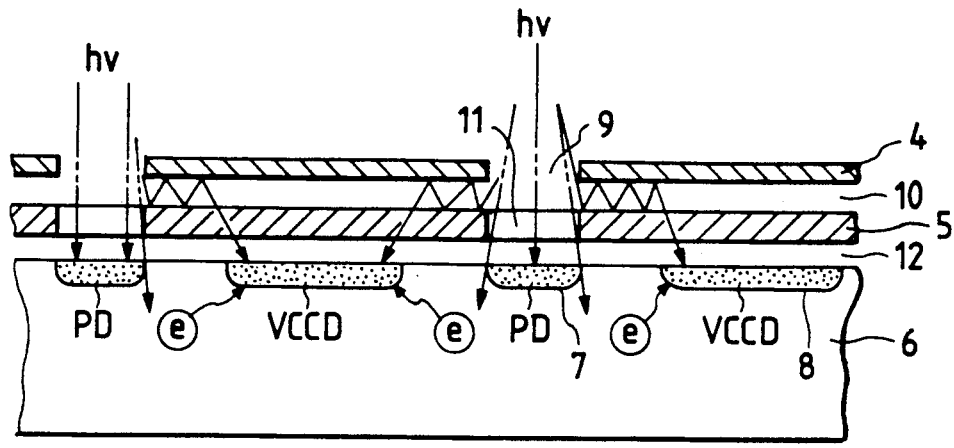
FIG. 4 is a sectional view for a description of field flickering.

FIG. 4 is a sectional diagram for a description of the principle of mixing smear components. Incidental light hv will pass through a hole 9 in a light shielding layer 4, which is somewhat reflective on the side away from the incident light, and will pass through a hole 11 in a transfer gate electrode 5 on a picture element (PD) 7. Certain of the incident light will be reflected within a space 10 between light shielding layer 4 and transfer gate electrode 5, which also is somewhat reflective on its light incident side. The reflected light will travel within the space 10 and will pass through transfer gate electrode 5 onto vertical charge coupled path (VCCD) 8. When the signal charges corresponding to the even-numbered field picture are held in the vertical charge transfer paths during the period of time that the signal charges corresponding to the odd-numbered field picture are temporarily held in the storage section, unwanted light passing through the space between a picture element 7 opened upwardly and a vertical charge transfer path 8 (VCCD) is reflected and applied to the vertical charge transfer path VCCD. This induces unwanted charges in the semiconductor substrate 6, thus causing smear.

For instance when, in a solid image pickup device, it is assumed that the smear value is represented by S, the charge transfer frequency by $F_H$, the output signal of a picture element in an odd-numbered field scanning operation by $V_E$, the output signal of a picture element in an even-numbered field scanning operation under the same conditions by $V_O$, and the shutter release period by $T_S$, then $$V_O = V_E(1 + (S \times f_H)/(T_S \times 60 \times 30 \times L_S) \times 10) \quad (1)$$

For instance, with $f_H = 1$ MHz, $S = 0.005\%$, $T_S = 1/60$ sec. and $L_S$ (the number of horizontal scanning lines) = 525, $$V_O = V_E \times 1.03$$

That is, a field flickering phenomenon can be visually detected because it is more than 1%.

Figure 3:
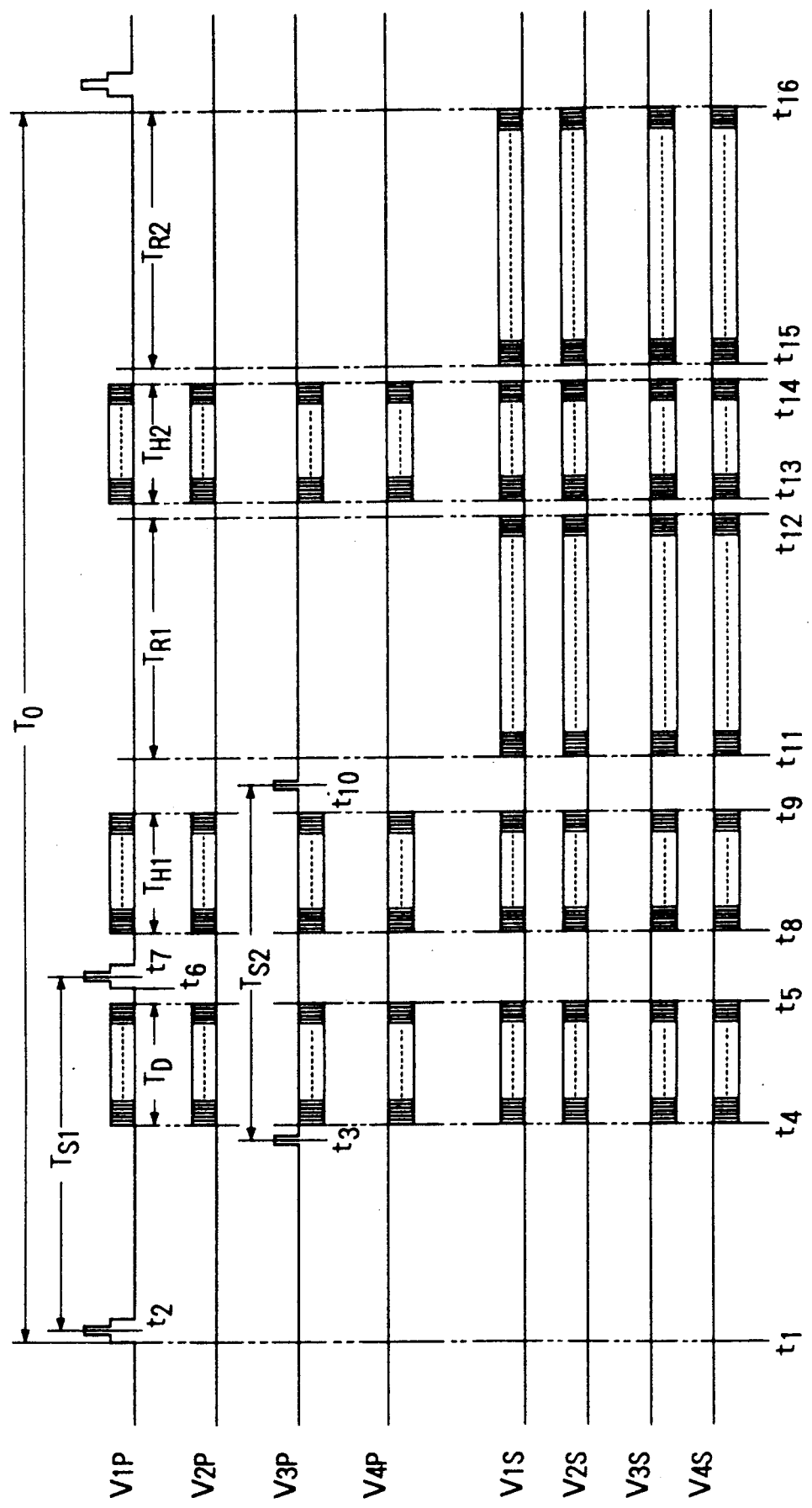
FIG. 3 is a block diagram of a second embodiment of the invention.

FIG. 3 represents a timing chart for the second embodiment of the present invention. The shutter period (exposure time) $T_{S1}$ of the odd-numbered field and the shutter period $T_{S2}$ of the even-numbered field are made different from each other according to the following principle.

The shutter periods $T_{S1}$ and $T_{S2}$ are detected with respect to desired shutter periods in advance so that, when light is applied for the picture elements of the odd-numbered and even-numbered fields under the same conditions, the output signals $V_{O1}$ and $V_{O2}$ of the odd-numbered and even-numbered fields obtained by scanning are equal to each other. That is, as is apparent from the above-described equation (1), when the output signals read out by the scanning of these fields are different from each other by at least about 1%, a field flickering phenomenon is detected. Therefore, the shutter periods $T_{S1}$ and $T_{S2}$ are so determined that the right and left sides of the following equation (2) obtained by modifying the above-described equation (1) are equal to each other:

$$V_{O2} = V_{O1} \times (T_{S2} + T_{smr})/T_{S1} \quad (2)$$

where $T_{smr} = (S \times f_H \times 10)/(60 \times 30 \times 525)$

The above-described equation (2) can be rewritten into the following equation (3):

$$T_{S2} = (V_{O2} \times T_{S1})/V_{O1} - T_{smr} \quad (3)$$

In equation (3), $V_{O1}$ and $V_{O2}$, and $T_{smr}$ are constants, and therefore the even-numbered shutter period $T_{S2}$ can be calculated with respect to the odd-numbered shutter period $T_{S1}$. This operation is carried out for all possible shutter speeds. As a result, in a photographing operation, specifying a desired shutter speed sets the shutter periods $T_{S1}$ and $T_{S2}$ corresponding thereto.

The setting of the shutter periods is achieved by adjusting the timing of reading the signals at the time instants $t_7$ and/or $t_{10}$ in FIG. 3.

As is apparent from the above description, the occurrence of field flickering phenomena can be suppressed by adjusting the shutter period so that, in the scanning of the odd-numbered and even-numbered fields, the ratios of the smear component to signal charge are equal to each other.

Furthermore, during the period $T_O$ between the time instants $t_1$ and $t_{16}$, the signal charge for one frame, that is, the signal charges produced by all the picture elements can be read out. Therefore, with the driving method of the invention, the resolution can be doubled as compared with the conventional driving method.

In the above-described embodiments, the even-numbered field signal charges are read out after the odd-numbered field signal charges. However, the odd-numbered field signal charges may be read out after the even-numbered field signal charges.

Figure 5:
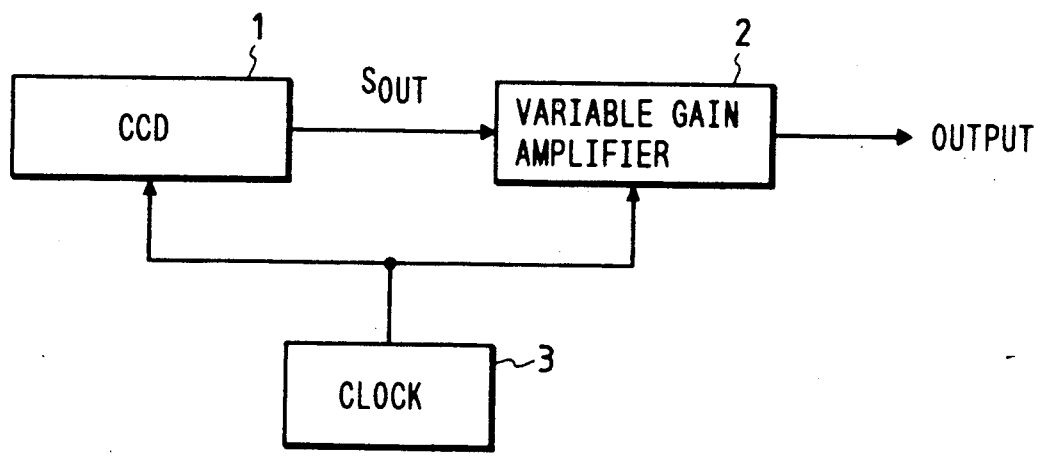
FIG. 5 is a third embodiment of the present invention.

FIG. 5 shows another embodiment of the present invention. The embodiment comprises a variable gain amplifier 2 for amplifying a video signal $S_{out}$ which is read out of the charge coupled device 1 in the solid image pickup device shown in FIG. 5. The variable gain amplifier is designed so as to switch, in synchronization with charge transfer clock signals from clock 3, the amplification factors of the video signal read out during an odd-numbered field scanning period and that read out during an even-numbered field scanning period.

That is, the above-described equation (3) can be rewritten into the following equation (4):

$$T_{S2} = (A_2 \times V_{O2} \times T_{S1})/(A_1 \times V_{O1}) - T_{smr} \quad (4)$$

where $A_1$ is the amplification factor variable gain amplifier in the odd-numbered field scanning operation, and $A_2$ is the amplification factor of the variable amplifier in the even-numbered field scanning operation.

The field flickering can be suppressed by suitably adjusting the amplification factors $A_1$ and $A_2$ of the variable gain amplifier. The same effect can be obtained by suitably adjusting the amplification factors $A_1$ and $A_2$ with the shutter periods $T_{S1}$ and $T_{S2}$ in the field scanning operations made equal to each other, or by suitably combining the shutter periods $T_{S1}$ and $T_{S2}$ and the amplification factors $A_1$ and $A_2$ in the adjustment.

As was described above, in the solid image pickup device driving method in which a solid image pickup device of frame transfer interline system is used to detect still picture signals, according to the invention, signal charges corresponding to a frame picture are read out by a first processing step in which signal charges produced by the picture elements in either odd-numbered fields or even-numbered fields are transferred to charge transfer paths in a light receiving section and then to a storage section. A second processing step is performed in which, with the signal charges held in the storage section, signal charges produced by the picture elements in the remaining fields are transferred to the charge transfer paths of the light receiving section. A third processing step occurs in which, with the signal charges held in the charge transfer paths, the signal charges of the storage section are output in series through a horizontal CCD. A fourth processing step is performed in which, after the signal charges corresponding to the picture elements in the remaining fields held in the charge transfer paths are transferred to the storage section, the signal charges of the storage section are output in series through the horizontal CCD. Therefore, the method of the invention can provide still pictures with resolution. In the conventional solid image pickup device, the light receiving section and the storage section are substantially equal in size because of the driving method. In contrast, in the present invention, the storage section can be reduced in size to approximately half of the light receiving section. This means that the solid image pickup device can be miniaturized when compared with the conventional one.

Moreover, the shutter periods and/or the signal amplification factors of the odd-numbered and even-numbered fields are adjusted so that, with respect to he picture elements of the odd-numbered and even-numbered fields, with light applied under the same conditions, the output signals of the odd-numbered and even-numbered fields obtained through scanning are equal to each other. Therefore, the ratio of the video signal to smear in both the odd-numbered and even-numbered field scanning operations are equal, and field flickering is suppressed. The same effect can be obtained by the method in which the output signal amplification factor is adjusted in every field scanning operation whereby the ratio of the smear component to signal charge in one of the field scanning operations is made equal to that of the smear component to signal charge in the other.

What is claimed is:

1. A method for driving a solid image pickup device comprising light receiving elements arranged in first and second fields, the elements being operatively connected to charge transfer paths in a light receiving section and a storage section, the storage section being operative to output its contents to a charge coupled device (CCD), comprising:
    (a) transferring first signal charges produced by light receiving elements in said first field to charge transfer paths in said light receiving section and then to said storage section;
    (b) transferring, while said first signal charges are held in said storage section, second signal charges produced by light receiving elements in said second field to said charge transfer paths in said light receiving section;
    (c) outputting, while said second signal charges are held in said charge transfer paths of said light receiving section, said first signal charges in said storage section through said CCD;
    (d) utilizing a first time interval, which spans from the reception of light in said light receiving elements in said first field until the transferring of said first signal charges to said charge transfer paths, as a shutter period for said first field, and
    (e) utilizing a second time interval, which spans from the reception of light in said light receiving elements in said second field until the transferring of said second signal charges to said charge transfer paths, as a shutter period for said second field.

2. A method for driving a solid image pickup device as claimed in claim 1, wherein said first field contains odd-numbered field elements and said second field contains even-numbered field elements.

3. A method for driving a solid image pickup device as claimed in claim 1, wherein said first field contains even-numbered field elements and said second field contains odd-numbered field elements.

4. A method for driving a solid image pickup device as claimed in claim 1, wherein said CCD is a horizontal CCD.

5. A method for driving a solid image pickup device as claimed in claim 1, wherein said outputting steps comprise, respectively, outputting said first and second signal charges in series through said CCD.

6. The method of claim 1, wherein said shutter periods of said first and second fields are selected so that outputs obtained from said light receiving elements in said first and second fields under identical photographing conditions are equal.

7. A method for driving a solid image pickup device as claimed in claim 6, wherein said shutter periods of said first and second fields are equal, and the amplification level of output signals are adjusted so that outputs from said light receiving elements in said first and second fields under identical conditions are equal.

8. The method for driving a solid image pickup device as claimed in claim 1, wherein said shutter period of said first and second fields are different, whereby the ratio of the smear component to signal charge is related to said first field and equal to that of the smear component to signal charge related to said second field.

9. A method for driving a solid image pickup device as claimed in claim 1, wherein said outputting steps comprise an amplification of output signals and the amplification level of output signals are adjusted so that outputs from said light receiving elements in said first and second fields under identical conditions are equal.

10. The method of claim 1, further comprising an initial step of eliminating unwanted charges from said light receiving elements.

* * * * *